C. SCHAUWINHOLD.
TRANSPORT CARRIAGE FOR GUNS.
APPLICATION FILED JULY 25, 1910.
1,006,882.
Patented Oct. 24, 1911.
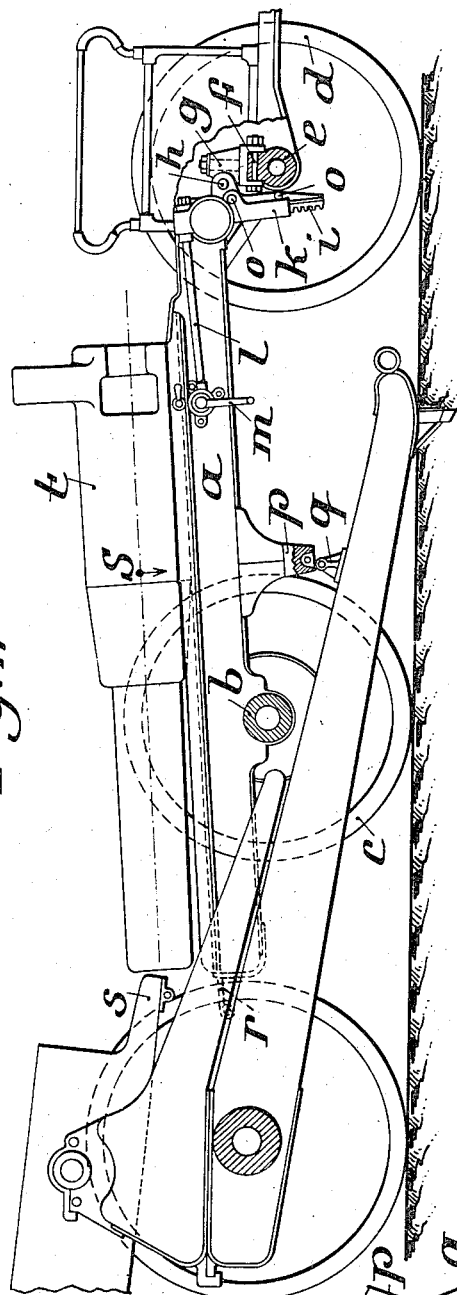
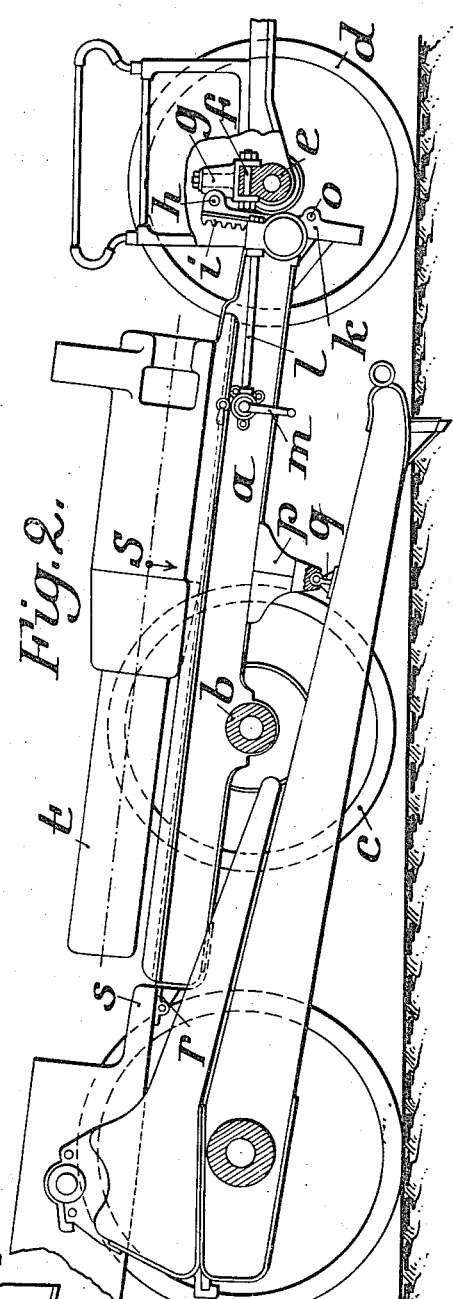
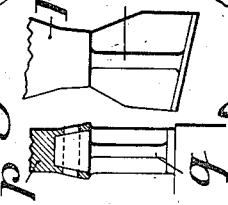
WITNESSES
INVENTOR

UNITED STATES PATENT OFFICE.

CARL SCHAUWINHOLD, OF DUSSELDORF, GERMANY, ASSIGNOR TO RHEINISCHE METALLWAAREN- UND MASCHINENFABRIK, OF DUSSELDORF-DERENDORF, GERMANY.

TRANSPORT-CARRIAGE FOR GUNS.

1,006,882.   Specification of Letters Patent.   Patented Oct. 24, 1911.

Application filed July 25, 1910. Serial No. 573,634.

*To all whom it may concern:*

Be it known that I, CARL SCHAUWINHOLD, engineer, a subject of the German Emperor, residing at 13 Kaiserstrasse, Dusseldorf, Germany, have invented certain new and useful Improvements in Transport-Carriages for Guns; and I do hereby declare the following to be a full, clear, and exact description of the invention, such as will enable others skilled in the art to which it appertains to make and use the same.

This invention provides devices for facilitating the transference of a gun barrel from its carriage to a transport wagon and vice-versa, whereby, with the expenditure of very little power the surface on which the barrel rests on the gun carriage and that on which it rests on the transport wagon are brought into alinement so that the barrel can be slid from one surface to the other. For this purpose the transport wagon comprises a rear wagon, the beam of which carries the surface to receive the gun and is connected with a limber by, for example, a kind of elevating mechanism, in such a manner that the beam can be turned about an axis to produce the aforesaid alinement.

One or more supports on the gun carriage coöperate with corresponding projections on the wagon in such a manner that as soon as the said supports and projections engage a fulcrum is provided for the beam. When the beam is turned on this fulcrum, the wheels of the rear wagon are raised from the ground and the beam is brought into a position relatively to the gun carriage or cradle which is determined by the said fulcrum, this fulcrum being parallel to the wheel axis of the gun carriage and independent of the inclination of the ground.

The projections on the transport wagon which coöperate with the supports on the gun carriage are preferably situated in the plane passing through the center of gravity of the rear wagon at right angles to the longitudinal axis thereof, in order that the turning of the beam on the fulcrum requires very little power. Moreover, the position of rest of the gun barrel on the surface of the transport wagon is as far as possible, such that the center of gravity of the barrel is substantially in the aforesaid plane.

One construction according to the invention is shown in the accompanying drawing, Figure 1 being a sectional elevation of the gun and transport wagon after the gun barrel has been transferred from the gun carriage to the transport wagon; Fig. 2 is a like view in which the surfaces of the gun carriage and the wagon are connected to form a continuous plane, and Fig. 3 a detail view.

The transport wagon consists of a limber and a rear wagon connected together by a kind of elevating mechanism, one part of which is universally jointed to the limber or to the rear wagon. The body of the rear wagon is the beam $a$ having a surface on which the gun barrel can slide and supported by the axle $b$ and wheels $c$. The limber comprises an axle $e$ carried by wheels $d$; to this axle is fixed by means of a horizontal bolt $f$ at right angles to the axle $e$, a vertical pivot pin $g$. A sleeve is mounted to turn on the pin $g$, and to this sleeve is pivoted by a bolt $h$, parallel to the axle $e$, a rack $i$.

A casing $k$ carried by the end of the beam $a$ and surrounding the rack $i$, contains a pinion which can be driven through a worm gear, a shaft $l$ and bevel gear, by a crank $m$, thus causing the casing $k$ to slide on the rack $i$. By this means the inclination of the beam is varied. The rack $i$ and the casing $k$ have perforations $o$ $o$ of the same diameter, which are in register with each other in the position that the casing and rack have when the wagon is to travel so that a pin can be inserted in the perforations whereby the teeth of the rack are relieved from the weight of the pole.

Below the center of gravity of the rear wagon the latter carries two downwardly extending brackets $p$ and the trail of the gun carriage carries two upwardly extending brackets $q$. The ends of brackets $p$ are recessed, preferably hemi-spherically or semi-cylindrically (Fig. 3) and the ends of brackets $q$ are correspondingly shaped, the axis of the cylinder in the latter case being at right angles to the longitudinal axis of the wagon or the gun carriage; the side faces of the recesses diverge downwardly so that the brackets $p$ engage brackets $q$ even if they are not exactly in register. The brackets are bored for reception of a pin and afford a fulcrum for the rear wagon.

The apparatus is used as follows: The rear wagon is brought into the position shown in Fig. 1, the front end of the beam $a$ being raised by operating the crank *m*. The transport wagon is then moved backward over the gun carriage so that the brackets *p* and *q* register with each other. By means of the crank *m* the front end of the beam is now lowered, such beam pivoting on axle *b* until the brackets *p* engage the brackets *q*. When the front end of the beam *a* is still further lowered, such beam turns on the fulcrum afforded by the brackets and the wheels *c* are raised from the ground so that the beam *a* assumes the inclined position shown in Fig. 2, the trail remaining in its fixed position. In this position a projection *r* on the beam *a* is in contact with the cradle *s* which has previously been brought to a certain elevation; this projection may be connected with the cradle by means of a bolt or otherwise. The surfaces of the beam *a* and the gun carriage or cradle *s* then form a continuous plane along which the barrel can be moved by suitable devices. After the barrel has been brought into the desired position, the aforesaid operations are reversed to separate the wagon from the gun carriage. The power required to raise the wheels *c* is small since the fulcrum *p q* is vertically below the center of gravity of the rear wagon. The position of rest of the barrel on the rear wagon is also such that its center of gravity S is vertically above the said fulcrum, so that the power is not substantially increased when the wagon is loaded. This mode of transferring the barrel is quite independent of the direction or elevation of the gun. The beam *a* finally rests only on the brackets *q* on the gun carriage and therefore always assumes the same previously determined position relatively to the cradle *s*. The universal jointing of the beam to the limber makes it of no moment that the beam remains connected with the limber.

I claim as my invention:—

1. In combination with a gun carriage having a cradle and a trail, a gun transporting vehicle comprising a body having oppositely disposed carrying wheels whose axis is nearer one end of the body than the other end, pivot bearings carried by the body and designed to fulcrum on the trail, such pivot bearings being between said axis and said other end of the body to permit the body to be swung on said pivot bearings in being moved into and out of the plane of the cradle.

2. In combination with a gun carriage having a cradle and a trail, a gun transporting vehicle comprising a body having oppositely disposed carrying wheels whose axis is nearer one end of the body than the other end, pivot bearings depending from the body and located between said axis and said other end of the body, coöperating bearings mounted on the trail and with which the bearings of the body are designed to engage when said other end of the body is moved downwardly to position the body on the plane of the cradle.

3. The combination with a gun carriage having a cradle and a trail, of a transporting vehicle comprising a body, oppositely disposed carrying wheels whose axis is nearer one end of the body than the other end, a wheeled truck, a shiftable connection between such other end of the body and said wheeled truck, and means for pivoting said body on said trail at a point intermediate the axis of said carrying wheels and said truck.

4. The combination with a gun carriage having a cradle and a trail, of a transporting vehicle comprising a body having oppositely disposed carrying wheels whose axis is nearer one end of the body than the other end, a truck to which such other end of the body is shiftably connected, and pivot bearings depending from the body and designed to swing on said trail, the pivot formed by said bearings being in or near the vertical plane through the center of gravity of the body when carrying its load.

5. In combination with a gun carriage, a vehicle for transporting gun barrels comprising a body, carrying wheels therefor, a wheeled truck to which the front end of the body is adjustably connected, and coöperating bearings between the body and the gun carriage forming an axis in or near the vertical plane through the center of gravity of the body when carrying its load.

6. A vehicle for transporting gun barrels comprising a body, carrying wheels therefor, a wheeled truck, gearing between said body and said wheeled truck, and a pivot bearing for said body intermediate its carrying wheels and the truck, said body being capable of being swung by said gearing on the axis of said wheels and also on said pivot bearing.

7. A vehicle for transporting gun barrels comprising a body, carrying wheels therefor, a wheeled truck, raising and lowering mechanism between the body and said wheeled truck, a pivot bearing for said body intermediate its carrying wheels and the truck, said mechanism being capable of swinging said body on the axis of said wheels and also on said pivot bearings, and means for fixedly locking said body to said truck.

8. In combination with a gun-carriage, a vehicle for transporting gun barrels comprising a body, carrying wheels therefor, a limber to which the front end of the body is adjustably connected, and coöperating bearings between the body and the gun-carriage forming an axis forward of said carrying wheels upon which the body and wheels may be turned on a vertical plane.

9. A vehicle for transporting gun barrels comprising a body, carrying wheels therefor, a limber, raising and lowering mechanism mounted on the body and having a universal connection with the limber, and a fulcrum bearing for the body at a point intermediate its carrying wheels and the limber.

In testimony whereof, I have signed this specification in the presence of two subscribing witnesses.

CARL SCHAUWINHOLD. [L. S.]

Witnesses:
CHAS. J. WRIGHT,
WALTER VONNEGUT.